(12) United States Patent
Hunt et al.

(10) Patent No.: US 9,471,214 B2
(45) Date of Patent: Oct. 18, 2016

(54) MULTI-MODE USER INTERFACE

(71) Applicant: Lenovo (Singapore) Pte. Ltd., New Tech Park (SG)

(72) Inventors: James Anthony Hunt, Chapel Hill, NC (US); Xu Haisheng, Beijing (CN); Karen Ruth Kluttz, Raleigh, NC (US); Cai Ming, Beijing (CN); Michael Terrell Vanover, Raleigh, NC (US); Yao Yuan, Beijing (CN)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 338 days.

(21) Appl. No.: 14/313,805

(22) Filed: Jun. 24, 2014

(65) Prior Publication Data
US 2014/0310645 A1   Oct. 16, 2014

Related U.S. Application Data

(62) Division of application No. 12/750,229, filed on Mar. 30, 2010, now abandoned.

(60) Provisional application No. 61/259,985, filed on Nov. 10, 2009.

(51) Int. Cl.
*G06F 3/048* (2013.01)
*G06F 3/00* (2006.01)
(Continued)

(52) U.S. Cl.
CPC ........... *G06F 3/0485* (2013.01); *G06F 3/0481* (2013.01); *G06F 3/0484* (2013.01);
(Continued)

(58) Field of Classification Search
CPC .................. G06F 3/0481; G06F 2203/04803; G06F 9/4443
See application file for complete search history.

(56) References Cited

U.S. PATENT DOCUMENTS 5,874,959 A  *  2/1999  Rowe .................. G06F 3/04842
                                                           345/592
6,222,532 B1    4/2001  Ceccarelli
(Continued)

FOREIGN PATENT DOCUMENTS

| CN | 1812469 A | 8/2006 |
|----|-----------|--------|
| CN | 1955907 A | 5/2007 |
| CN | 1956458 A | 5/2007 |

OTHER PUBLICATIONS

James Anthony Hunt, Xu Haisheng, Karen Ruth Kluttz, Cai Ming, Michael Terrell Vanover, Yao Yuan, "Multi-Mode User Interface", file history of related U.S. Appl. No. 14/313,743, filed Jun. 24, 2014.

*Primary Examiner* — Jordany Nunez
(74) *Attorney, Agent, or Firm* — John L. Rogitz; John M. Rogitz

(57) ABSTRACT

An approach is provided to display a grid user-interface on a display. The grid user-interface includes a number of medium-sized windows that are displayed in a grid format. Each of the medium-sized windows has a substantially common width and a substantially common height to the other medium-sized windows. The system receives a mixed-mode request from a user. The mixed-mode request corresponds to a selected application that is displayed in one of the medium-sized windows. A second user-interface is displayed in response to receiving the mixed-mode request. The selected application is displayed in a large window and a plurality of small-sized windows is displayed adjacent to the large window. Each of the small-sized windows also has a substantially common width and a substantially common height to the other small-sized windows.

18 Claims, 14 Drawing Sheets

(51) Int. Cl.
  *G06F 13/00* (2006.01)
  *G06F 15/00* (2006.01)
  *G06F 3/0485* (2013.01)
  *G06F 3/0481* (2013.01)
  *G06F 9/44* (2006.01)
  *H04L 29/06* (2006.01)
  *G06F 3/0484* (2013.01)

(52) U.S. Cl.
  CPC ......... *G06F3/04847* (2013.01); *G06F 9/4443* (2013.01); *H04L 63/08* (2013.01); *G06F 2203/04803* (2013.01)

(56) References Cited

U.S. PATENT DOCUMENTS

| | | |
|---|---|---|
| 6,868,192 B2 | 3/2005 | Takiguchi |
| 7,493,570 B2 | 2/2009 | Bobbin et al. |
| 7,681,143 B2 * | 3/2010 | Lindsay ................ G06F 3/0481 715/779 |
| 2003/0189597 A1 | 10/2003 | Anderson et al. |
| 2003/0202110 A1 * | 10/2003 | Owens ................ H04N 1/00283 348/222.1 |
| 2003/0234772 A1 | 12/2003 | Zhang et al. |
| 2005/0081155 A1 * | 4/2005 | Martin ................... G11B 27/34 715/719 |
| 2007/0245407 A1 | 10/2007 | Lester et al. |
| 2007/0256024 A1 * | 11/2007 | Schell ................... G06F 3/0481 715/762 |
| 2008/0231544 A1 * | 9/2008 | Cooper ................ G06F 3/1446 345/1.1 |
| 2008/0301579 A1 | 12/2008 | Jonasson et al. |
| 2008/0307351 A1 | 12/2008 | Louch et al. |
| 2011/0022984 A1 * | 1/2011 | van der Meulen . G06F 9/44526 715/830 |
| 2014/0261096 A1 * | 9/2014 | Epstein ................. H04N 5/268 108/28 |

* cited by examiner

MULTI-MODE USER INTERFACE

REFERENCE TO PROVISIONAL APPLICATION

This application is a non-provisional patent application claiming benefit to provisional patent application No. 61/259,985 which was filed on Nov. 10, 2009.

BACKGROUND OF THE INVENTION

1. Technical Field

Subject matter disclosed herein relates to an approach that provides multiple user interface modes to a user of an information handling system.

2. Description of the Related Art

Modern information handling systems typically employ a user interface (UI), such as a graphical user interface (GUI) that allows a user to operate the information handling system often will little or no formal computer training. These information handling system can include traditional computer systems, hand held devices, such as personal digital assistants (PDAs) and media players, gaming systems, household appliances, office equipment, and other devices. Traditional GUI systems include GUI components such as icons and windows. An icon is a small pictogram that often represents a computer function, such as an application program or program function. Users select icons in order to execute the desired program or function. A window is an area displayed on a hardware display that displays content related to a program or function independently from the rest of the visible screen.

SUMMARY

An approach is provided to display a grid user-interface on a display. The grid user-interface includes a number of medium-sized windows that are displayed in a grid format. Each of the medium-sized windows has a substantially common width and a substantially common height to the other medium-sized windows. The system receives a mixed-mode request from a user. The mixed-mode request corresponds to a selected application that is displayed in one of the medium-sized windows. A second user-interface is displayed in response to receiving the mixed-mode request. The selected application is displayed in a large window and a plurality of small-sized windows is displayed adjacent to the large window. Each of the small-sized windows also has a substantially common width and a substantially common height to the other small-sized windows.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention may be better understood by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the exemplary software and/or hardware techniques associated with the invention. A networked environment is illustrated in FIG. 2 as an extension of the basic computing environment, to emphasize that modern computing techniques can be performed across multiple discrete devices.

Figure 1:
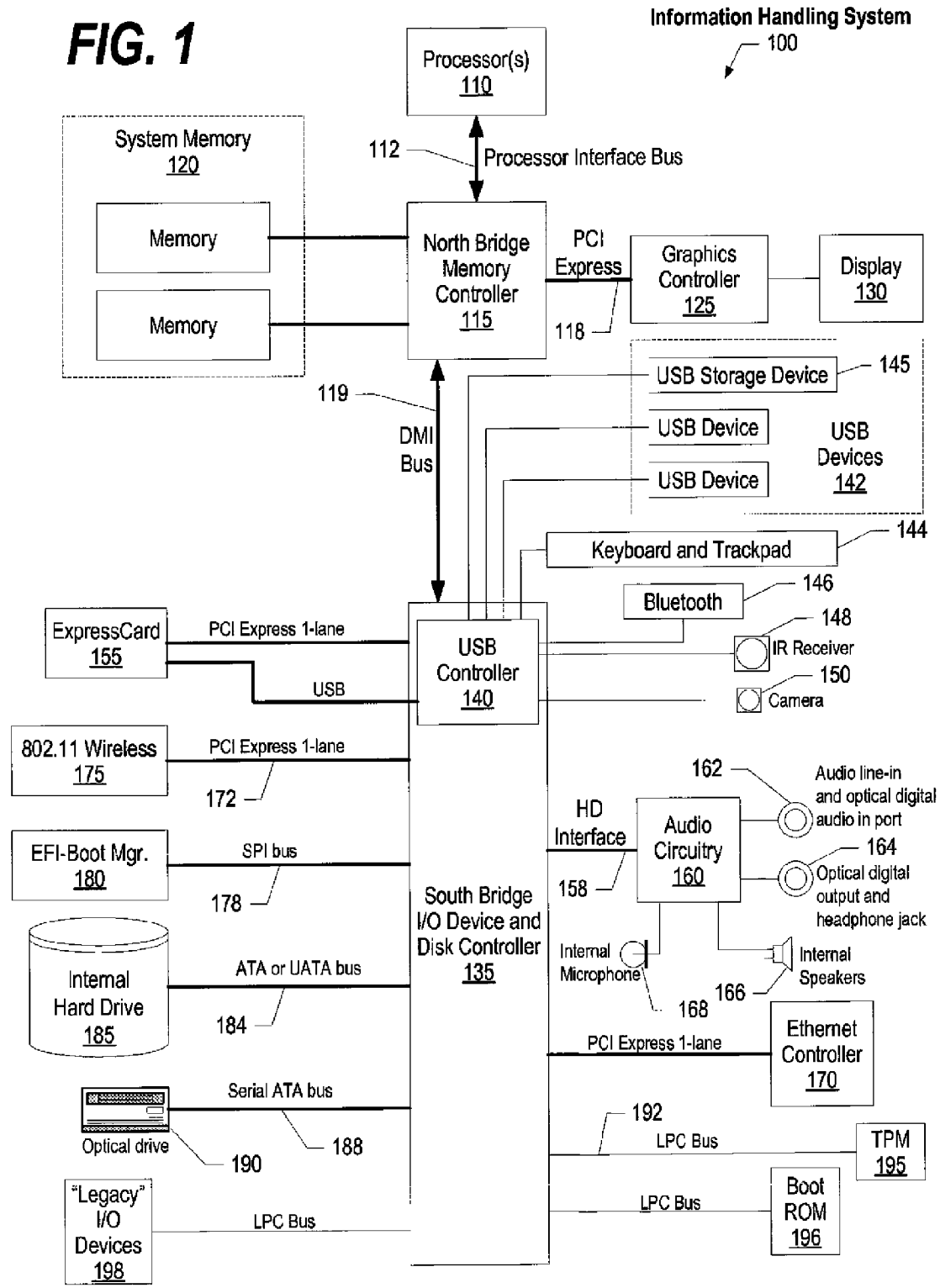
FIG. 1 is a block diagram of a data processing system in which the methods described herein can be implemented.
Figure 2:
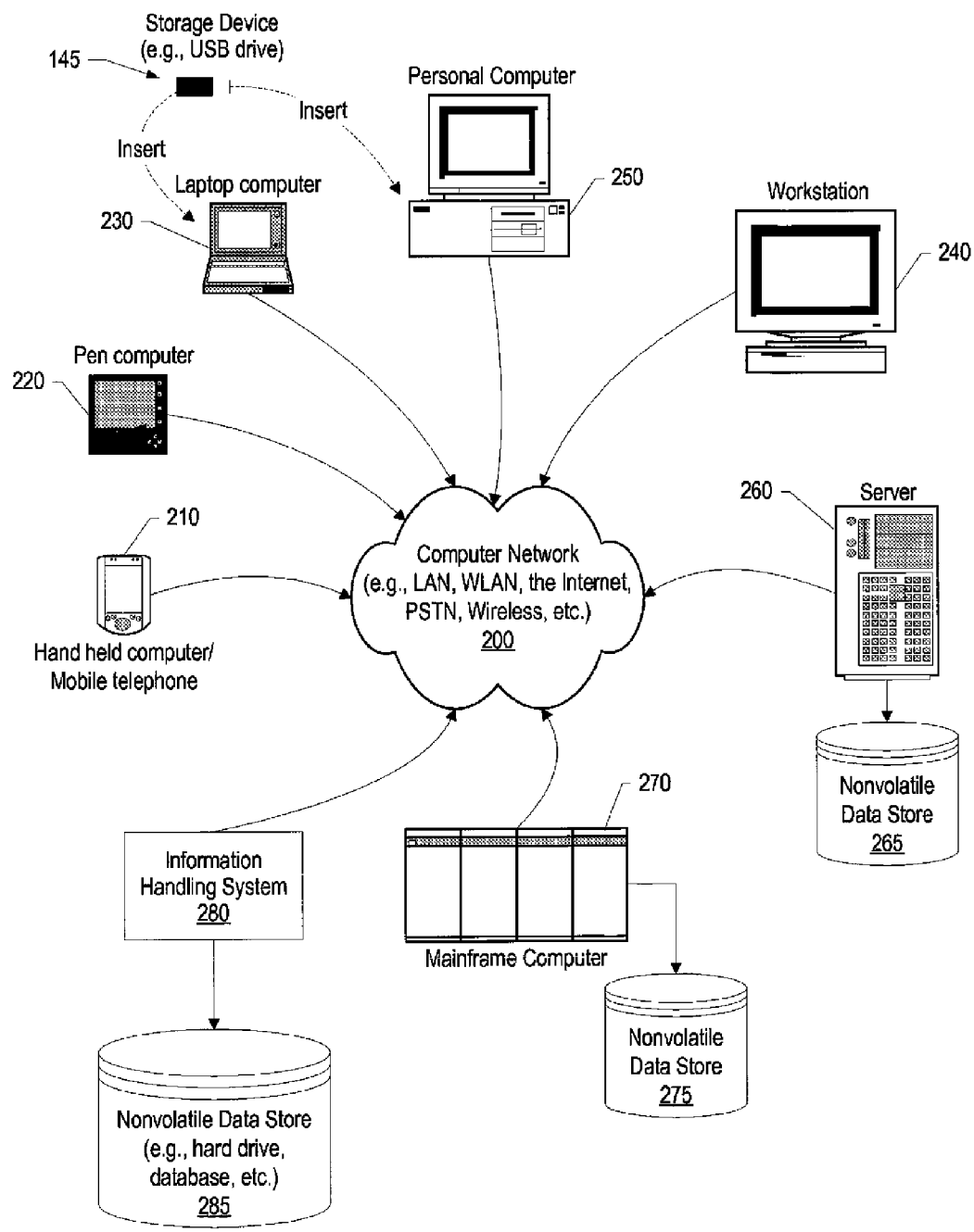
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). An external device can wirelessly connect to Bluetooth device 146 and transmit data to the information handling system, in which case Bluetooth device 146 acts as a data receiver for the information handling system. USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera. When an external device is connected to USB controller 140 that is capable of receiving data from the information handling system, the USB controller acts as a data receiver.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks. When an external device connects to the information handling system using wireless LAN device 175 or wired LAN via a connection to Ethernet controller 170, and when the external device sends data to the information handling system, the LAN device 175 performs the role of a data receiver. Indeed, any device that can route or transmit data to the information handling system via a component of the information handling system acts as an external device and the component that receives such data acts as a data receiver of the information handling system.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
FIG. 3 is a diagram showing an initial logon screen used to verify access of a user before accessing data and processes provided by the information handling system.

FIG. 3 is a diagram showing an initial logon screen used to verify access of a user before accessing data and processes provided by the information handling system. Initial logon screen 300 is presented to the user when the user returns to the system after locking the system during a previous use. A "welcome back" message is displayed to the user and the user is prompted to enter user name 310 and password 320. When these items are entered, the user presses GUI control 330 whereupon the user's name and password are verified before allowing the user to access the information handling system. In addition, if the user forgets his or her password, a password hint can be requested by selecting GUI control 340. GUI control command buttons 350 and 360 are selected by the user to, respectively, shutdown the information handling system or restart the information handling system.

Figure 4:
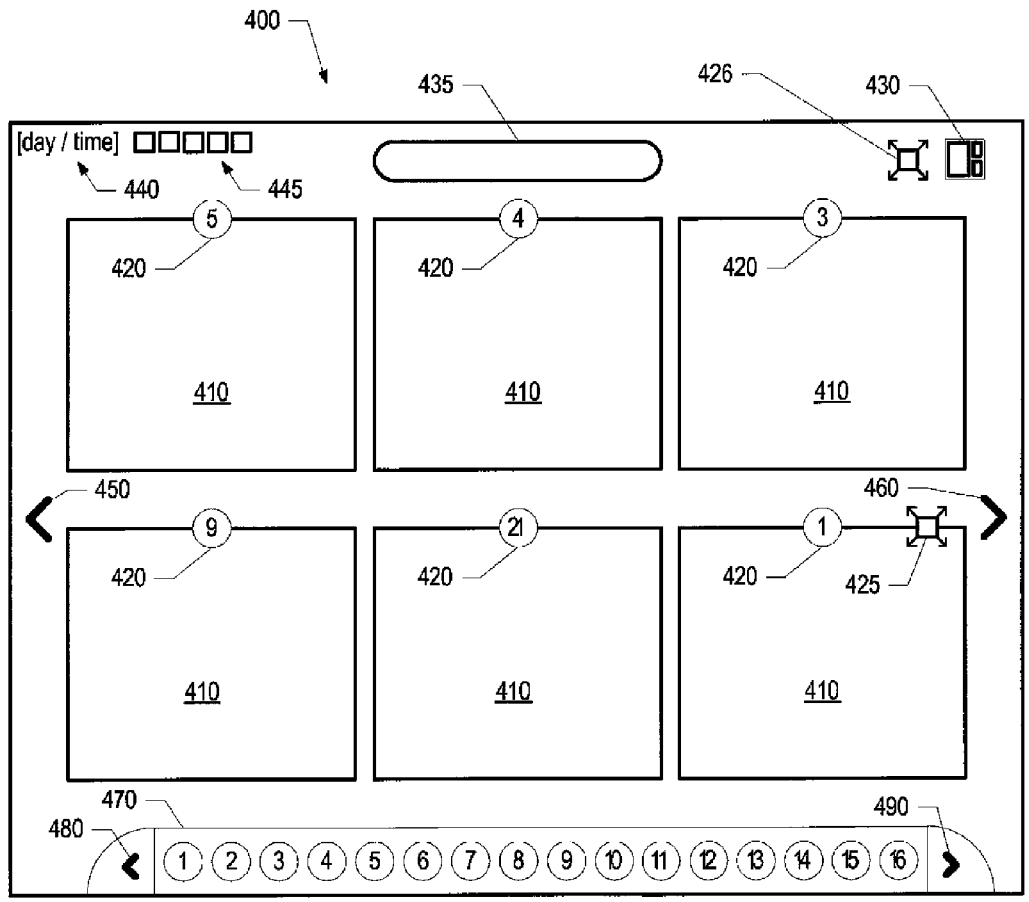
FIG. 4 is a diagram showing a grid display screen used to display a certain number of like-sized windows and an icon ribbon used to select additional applications.

FIG. 4 is a diagram showing a grid display screen used to display a certain number of like-sized windows and an icon ribbon used to select additional applications. Display screen 400 is displaying the grid display. In one embodiment, the grid display is called the "six space" view as there are six windows 410 visible on display screen 400. Other embodiments may utilize a different number of windows. Each of the windows, however, is a fixed, predetermined size so that the grid of windows appears with each window in the grid being the same size (width and height). Each window includes its associated icon 420 and these same icons can be found in icon ribbon bar 470. More than the visible number of windows can be utilized by the user. In order to see other opened windows, the user scrolls left or right using GUI controls 450 and 460, respectively. While left/right scrolling is shown with the grid view, other embodiments may be developed with the grid scrolling up and down. Also on display screen 400 is day/time indicator 440 and status icons 445. In addition, search control 435 allows the user to enter a search parameter into the GUI control and search for an item of interest. Multi-view icon 430, when selected, allows the user to exit the grid display and enter the multi-view display shown in FIG. 5. Full screen icon 425 may be applicable for some of the windows, such as a multimedia application displayed in one of the windows. Application "1" located in the lower left cell of the grid includes a full screen icon. If the user selects full screen icon 425, then application "1" is displayed in fullscreen mode (see FIG. 6). For example, application "1" might be a multimedia application to play multimedia content, such as a movie or video stream. When the user selects full screen icon 425, then the multimedia application would be displayed in fullscreen mode as shown in FIG. 6. Icon ribbon bar 470 shows icons associated with available applications. In the example shown, applications "5", "4", "3", "9", "21", and "1" are visible in grid display 400. These applications correspond with icons "1" through "16" shown in icon ribbon bar 470. Note, however, that the icon for application "21" is not currently visible in icon ribbon bar 470. In order to see the corresponding icon in ribbon bar 470, the user scrolls the ribbon bar using GUI controls 480 and 490. When GUI control 480 is selected, the icons are scrolled to the left and when GUI control 490 is selected, the icons are scrolled to the right. The user can select GUI controls 480 and 490, or any of the other GUI controls shown herein, in any number of ways, such as clicking on the GUI control with a mouse or trackpad, hovering over the control, and any other means by which the system recognizes that the user choses, or "selects," the GUI control. In the example, there is enough room in ribbon bar 470 to display 16 icons. When right GUI control 490 is selected, then the next 16 icons are displayed (e.g., "17" through "64"). In one embodiment, if there are not enough non-displayed icons to fill all 16 spots, then the icons wrap to display other icons that are currently being displayed. For example, if there are 26 current applications and the user selects right GUI control 480, then the next 10 icons are displayed on the left side of ribbon bar for applications "17" through "26" and remaining spots on the right side of ribbon bar 470 display icons for applications "1" through "6." Likewise, using the 26 icon example, if the user selected the right GUI control 480, then icons for applications "17" through "26" would be displayed on the right side of ribbon bar and icons for applications "11" through "16" would be displayed on the left side of ribbon bar 470. If the user wants to open a window for an application, the user simply selects the icon corresponding to the desired application from icon ribbon bar 470. For example, if the user wishes to open application "2", then the user simply selects the icon labeled "2" from ribbon bar 470. In one embodiment, the user can insert the window of the application in a desired grid location by selecting the icon and dragging it to the place on grid 400 where the use wants it to appear (e.g., between the "4" and the "3" applications). If, as in the example shown, the grid already has a full compliment of windows (e.g., six windows in the example shown), then one of the windows is shifted off of grid display 400. For example, if application "2" is opened between applications "4" and "3", then application "3" is shifted off of visible display grid 400. If the user wants to view the window for application "3", the user scrolls right using GUI arrow control 460. Windows that are displayed in grid 400 can be scrolled left and right similar to the ribbon bar control described above. In addition, similar to the ribbon bar, the windows displayed in grid 400 can "wrap" so that the user can cycle through all of the opened windows by repeatedly selecting the same GUI arrow control (either control 450 or control 460). In one embodiment, full screen icon 426 appears separate from an individual window. By selecting icon 426, the currently selected window (the focus window) is displayed in fullscreen mode (see FIG. 6).

Figure 5:
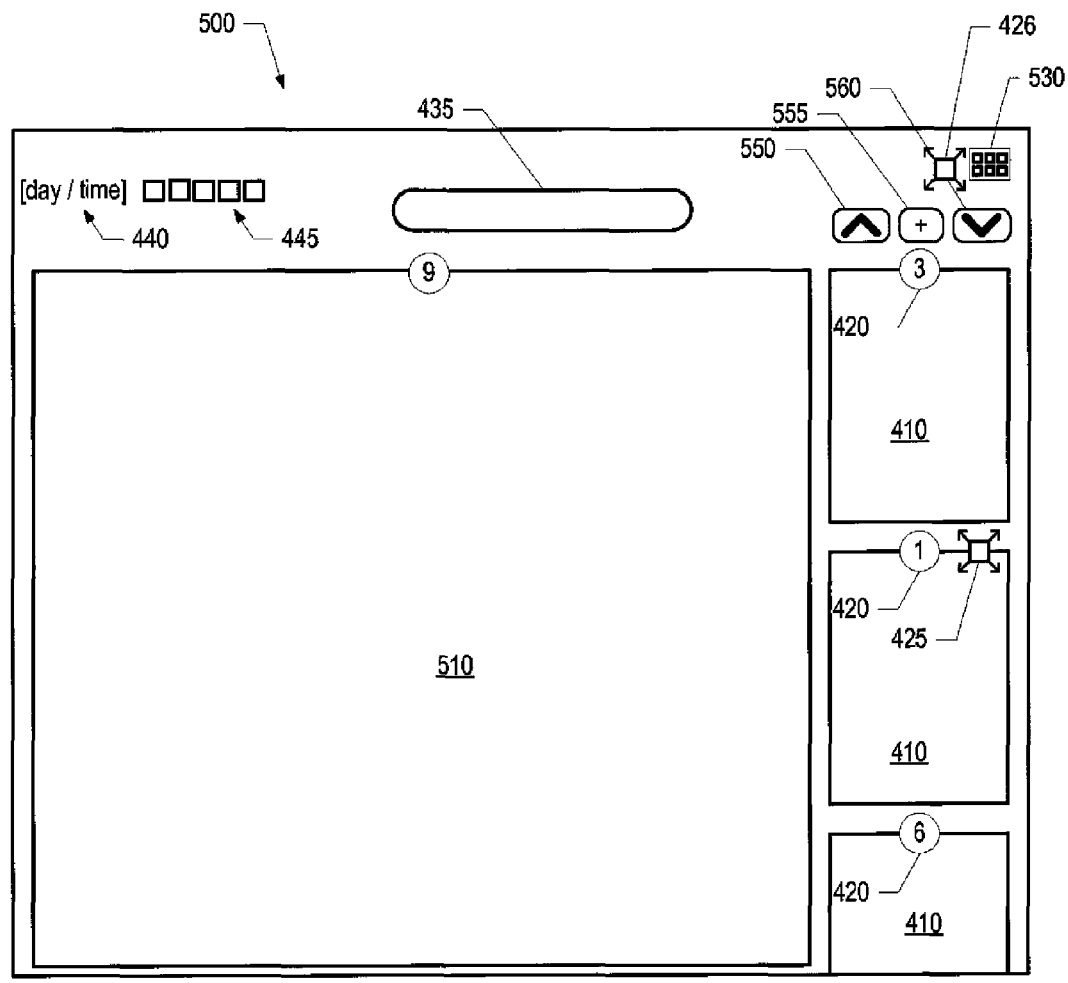
FIG. 5 is a diagram showing a mixed mode display screen used to display one large window and a number of like-sized vertically oriented windows.
Figure 6:
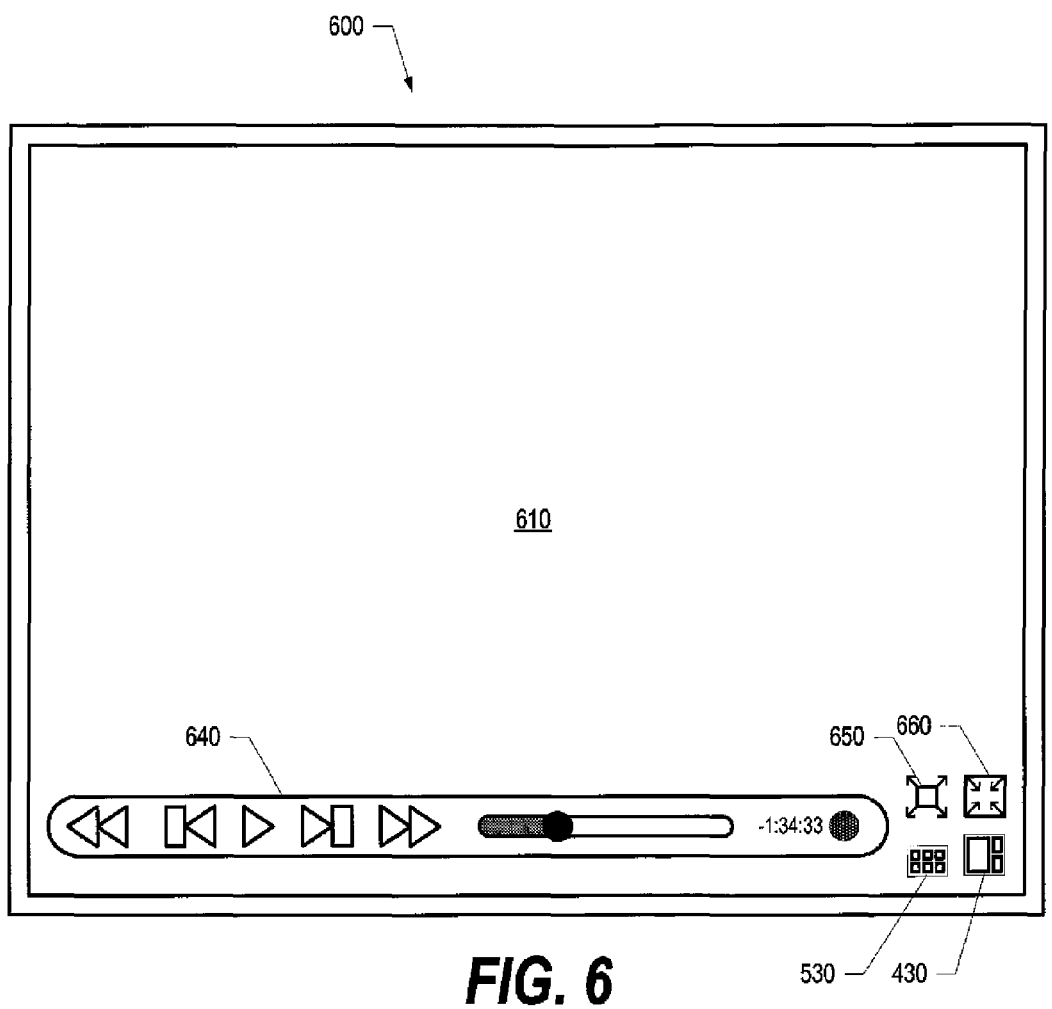
FIG. 6 is a diagram showing a fullscreen display screen used to display a selected application in a full screen.

FIG. 5 is a diagram showing a mixed mode display screen used to display one large window and a number of like-sized vertically oriented windows. Mixed mode display 500 is arranged with one large window 510 and smaller windows 410 arranged vertically. The GUI arrow controls are now vertical (GUI controls 550 (up) and 560 (down)) and allow the user to scroll windows 410 up and down as needed (similar to the windows in grid 400 shown in FIG. 4). GUI control 555 is used to manage windows 400 that appear in the vertical scrollable area as well as control the order in which the windows appear (see FIG. 14 and corresponding text for processing details). GUI control 530 is selected by the user in order to view the grid display shown in FIG. 4. The application (in this case application "9") shown in large window 510 is the application of focus. In one embodiment, the user selects a window 410 from the vertically scrollable display in order to make a different application appear in large window 510. For example, if the user selects application "3" (the top window in the vertically scrollable display), then application "3" will appear in large window 510 and application "9" will be shown in a smaller window 410 in the vertically scrollable area.

FIG. 6 is a diagram showing a fullscreen display screen used to display a selected application in a full screen. Full screen display 600 includes a single large window 610 where the selected application is displayed. In one embodiment, fullscreen display 600 includes both a cinema graphic mode for displaying multimedia content, such as movies and video streams, in large window 610 as well as a full screen mode for displaying application content, such as word processors, spreadsheets, and Web browsers, in large window 610. Controls 640 are either visible or hidden. When the controls are needed, the user requests the controls by selecting an area on the screen or pressing a key on the keyboard whereupon controls 640 appear to allow the user to control the content being displayed (e.g., previous, rewind, play, stop, pause, next, fast forward, and audio level controls). Controls 640 are typically used for multimedia content. In addition, icons 650, 660, 530, and 430 appear when requested by the user. Icon 650 is selected to expand the size of large window 610 while icon 660 is selected to reduce the size of large window 610. Icon 530 is used to change the view to grid mode, as shown in FIG. 4, and icon 430 is used to change the view to mixed mode, as shown in FIG. 5.

Figure 7:
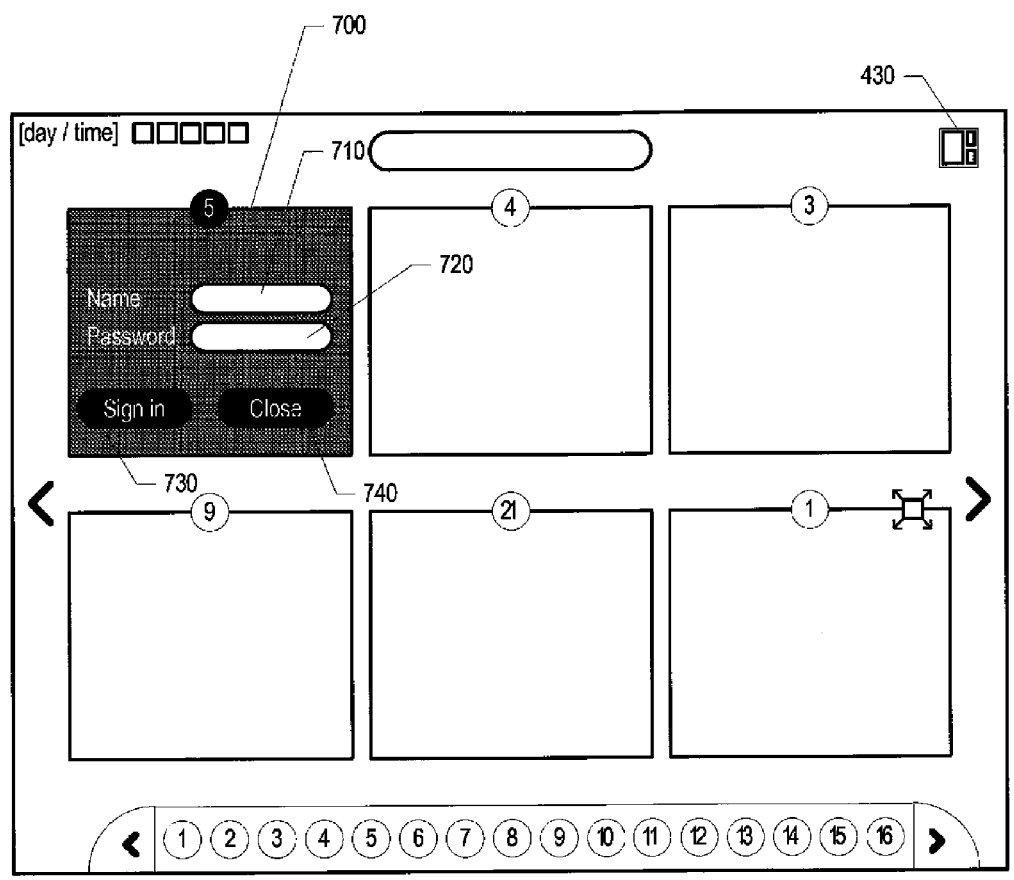
FIG. 7 is a diagram showing an application authentication flip screen where application authentication data is entered in order to use the selected application.

FIG. 7 is a diagram showing an application authentication flip screen where application authentication data is entered in order to use the selected application. When authentication is required, such as when a user is requesting to enter a secure Web site, the window appears to "flip" over with the "backside" of the window used to enter authentication data. "Flipping" is one example of animating the display of the backside of the window forming from the frontside of the window. In the example shown application "5" (see FIG. 4) such as an email site, has been selected, however the user needs to be authenticated before the requested application can be fully used by the user. The window appears to flip over with authentication window 700 appearing. In the example shown, the authentication data being requested includes a name 710 and password 720. When this data is provided, the user selects "sign in" GUI control 730 which passes the provided name and password to the application for processing. If the provided data is authentication, then the window will appear to "flip" back over to reveal the unlocked application (e.g., the email program with the user's emails now visible). To close the window, the user selects "close" GUI control 740. In one embodiment, as shown, authentication window 700 appears in an inverted format (e.g., dark background and white letters instead of light background and dark letters) in order to distinguish authentication windows from other windows.

Figure 8:
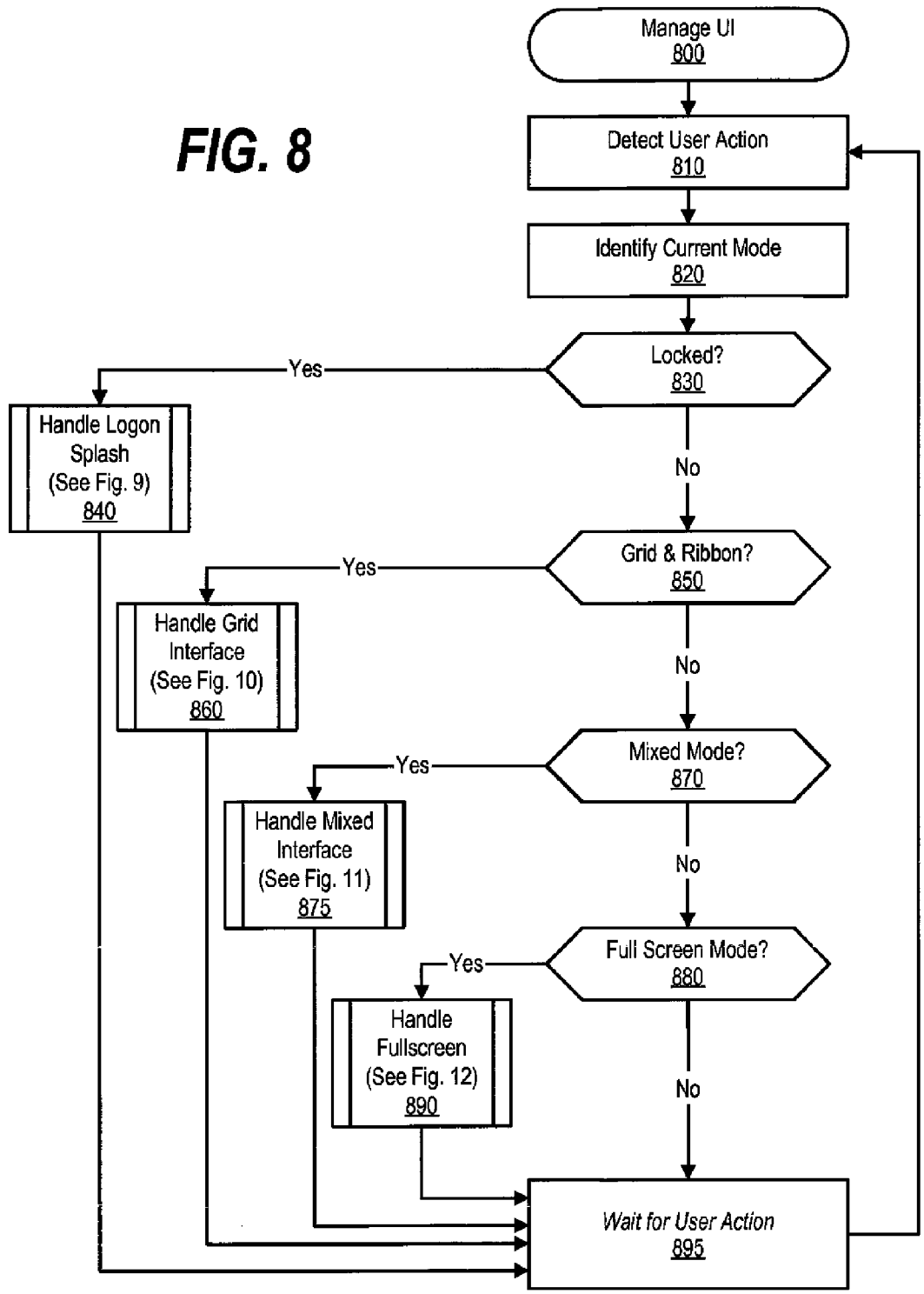
FIG. 8 is a flowchart showing steps taken to manage the graphical user interface.

FIG. 8 is a flowchart showing steps taken to manage the graphical user interface, Processing commences at 800 whereupon, at step 810, a user action is detected. At step 820, the current mode of the device is detected. The modes described in FIGS. 3-6 include locked mode (FIG. 3), grid mode (FIG. 4), mixed mode (FIG. 5), and fullscreen mode (FIG. 6). A determination is made as to whether the system is currently in locked mode (decision 830). If the system is in locked mode, then decision 830 branches to the "yes" branch whereupon, at predefined process 840, the logon screen is handled (see FIG. 9 and corresponding text for processing details). On the other hand, if the system is not in locked mode, then decision 830 branches to the "no" branch whereupon a determination is made as to whether the system is currently in the grid mode (decision 850). If the system is currently in grid mode, then decision 850 branches to the "yes" branch whereupon, at predefined process 860, the grid mode interface is handled (see FIG. 10 and corresponding text for processing details). On the other hand, if the grid mode is not the current mode, then decision 850 branches to the "no" branch whereupon a determination is made as to whether the current mode is mixed mode (decision 870). If the current mode is the mixed mode, then decision 870 branches to the "yes" branch whereupon, at predefined process 875, the mixed mode interface is handled (see FIG. 11 and corresponding text for processing details). On the other hand, if the current mode is not mixed mode, then decision 870 branches to the "no" branch whereupon a determination is made as to whether the current mode is fullscreen mode (decision 880). If the current mode is fullscreen mode, then decision 880 branches to the "yes" branch whereupon, at predefined process 890, the fullscreen mode interface is handled (see FIG. 12 and corresponding text for processing details). On the other hand, if the current mode is not fullscreen mode, then decision 880 branches to the "no" branch. After the user action has been handed by one of the predefined processes, processing waits for the next user action at 895. When the next user action is received, processing loops back to receive and process the user's action as described above.

Figure 9:
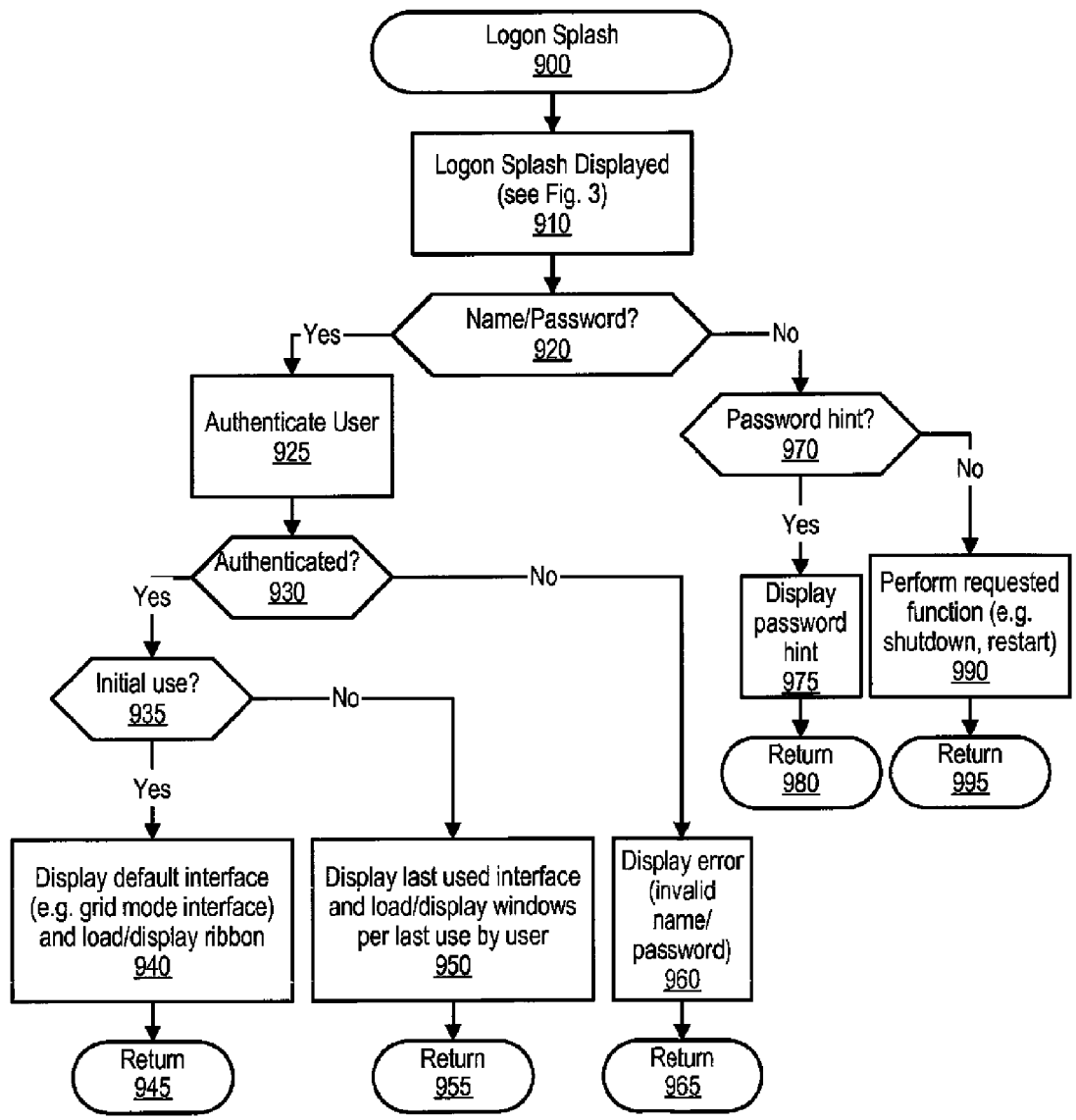
FIG. 9 is a flowchart showing steps taken to handle the logon screen used to access the information handling system.

FIG. 9 is a flowchart showing steps taken to handle the logon screen used to access the information handling system. Processing commences at 900 whereupon, at step 910, the logon screen is displayed (see FIG. 3 for an example of a system logon screen). A determination is made as to whether the user has entered authentication data, such as a name and password (decision 920). If the user has entered authentication data, then decision 920 branches to the "yes" branch whereupon, at step 925, the system attempts to authenticate the user using the provided authentication data (e.g., the user's name and password). A determination is made as to whether the user is successfully authenticated (decision 930). If the user is successfully authenticated, then decision 930 branches to the "yes" branch whereupon a determination is made as to whether this is the user's initial use of the system (decision 935). If this is the user's initial use of the system, then decision 935 branches to the "yes" branch whereupon, at step 940, the system displays Display default interface (e.g. grid mode interface) and load/display ribbon as needed (see FIGS. 4-5 for examples of possible default interfaces). Processing then returns to the calling routine (FIG. 8) at 945. Returning to decision 935, if this is not the user's initial use of the system, then decision 935 branches to the "no" branch whereupon, at step 950, the system displays the last used interface (see FIGS. 4-6 for examples of possible last used interfaces). Processing then returns to the calling routine (FIG. 8) at 955. Returning to decision 930, if the user is not authenticated (authentication failed), then decision 930 branches to the "no" branch whereupon, at step 960, an error is displayed to the user indicating that the user provided incorrect authentication data. Processing then returns to the calling routine (FIG. 8) at 965. Returning to decision 920, if the user is not attempting to be authenticated, then decision 920 branches to the "no" branch whereupon a determination is made as to whether is requesting a password hint (decision 970). If the user is requesting a password hint, then decision 970 branches to the "yes" branch whereupon, at step 975, the password hint (if available) is displayed to the user. Processing then returns to the calling routine (FIG. 8) at 980. Returning to decision 970, if a password hint is not being requested, then decision 970 branches to the "no" branch whereupon, at step 990, some other function being requested by the user (e.g., shutdown, restart, etc.) is performed. Processing then returns to the calling routine (FIG. 8) at 995.

Figure 10:
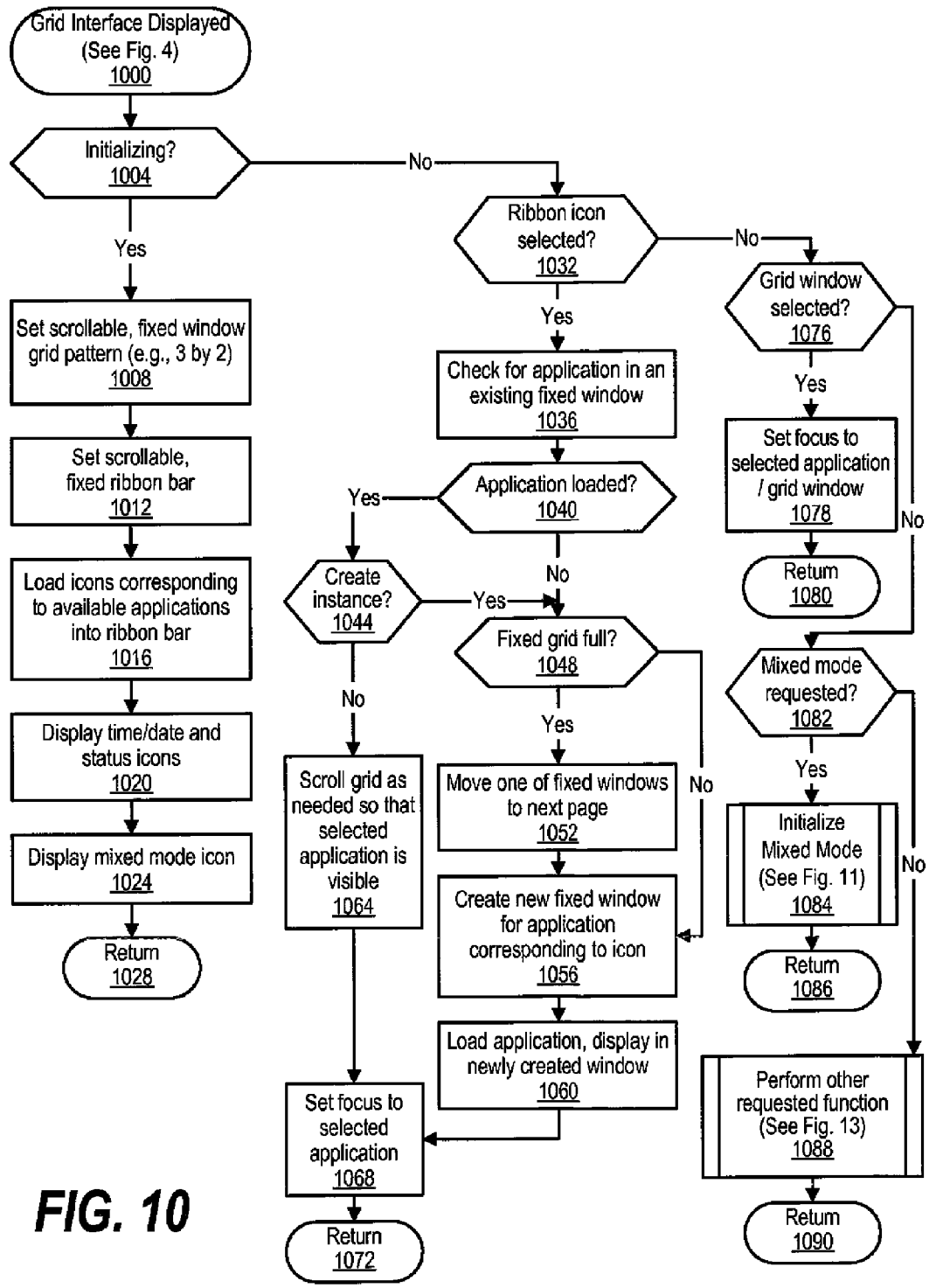
FIG. 10 is a flowchart showing steps taken to handle and display the grid display screen.

FIG. 10 is a flowchart showing steps taken to handle and display the grid display screen. Processing commences at 1000 whereupon a determination is made as to whether the grid mode interface is being initialized (decision 1004). If the grid mode interface is being initialized, then decision 1004 branches to the "yes" branch whereupon steps 1008 through 1028 are performed. At step 1008, a scrollable, fixed window grid pattern is set so that each application window displayed is substantially equal in size (width and height) and the windows are fixed so that they are not adjustable by the user. In one embodiment, the grid, as shown in FIG. 4, is three windows horizontally by two windows vertically for a total of six windows visible on the screen at a time. Other screen sizes may permit different configurations of fixed windows (e.g., 4 by 3, 6 by 4, etc.). At step 1012, a scrollable, fixed sized icon ribbon bar is displayed. In one embodiment, the icon ribbon bar is displayed at the bottom of the screen. At step 1016, icons are loaded (displayed) in the fixed ribbon bar. In one embodiment, the icons that are loaded are those applications available to the user. In another embodiment, the loaded icons have previously been identified as the user's "favorites," and in another embodiment, the loaded icons are those applications that are running in the computer system. The ribbon bar (see FIG. 4) is scrollable so that if more icons are loaded than can be displayed on the area of the visible ribbon bar, the icons can be scrolled (e.g., left and right) so that other icons appear on the ribbon bar. At step 1020, status icons and the time and date are displayed on the grid mode interface. At step 1024, a mixed mode icon is displayed (e.g., on the upper right portion of the screen). The mixed mode icon, when selected, allows the user to view the mixed mode interface (see FIG. 5). In one embodiment, a fullscreen icon is also displayed along with the mixed mode icon so that, when selected by the user, the application window that currently has focus is presented in a full screen interface (e.g., a multimedia application, etc.). Initialization processing returns to the calling routine at 1028.

Returning to decision 1004, if the grid mode interface is not being initialized, then decision 1004 branches to the "no" branch whereupon a determination is made as to whether the user has selected an icon from the icon ribbon bar (decision 1032). If the user has selected an icon from the icon ribbon bar, then decision 1032 branches to the "yes" branch whereupon, at step 1036, processing checks for the selected application in an existing fixed window that may or may not currently be visible on the display screen. A determination is made as to whether the application has already been loaded into a window (decision 1040) If the application has already been loaded into a window, then decision 1040 branches to the "yes" branch whereupon a determination is made as to whether to create a new instance of the application (decision 1044). Some applications can have several instances, such as multiple instances of a Web browser, that can each be displayed in separate windows. Other applications should only have a single instance of the program running in order to prevent issues such as data corruption if both instances are using the same database or data store. If the selected application can have multiple instances, then decision 1044 branches to the "yes" branch. Returning to decision 1040, if the selected application has not yet been loaded, then decision 1040 branches to the "no" branch or if the application can have multiple instances (decision 1044 branching to the "yes" branch), then a determination is made as to whether the available windows in the visible fixed grid (e.g., the six windows in a three by two grid) are all currently being used (decision 1048). In one embodiment, the user drags the icon to the area of the grid interface where the user wants the selected application to appear and the other applications are moved in order to make room for the application at the position specified by the user's drag gesture. If all of the available visible windows are currently being used by an application, then decision 1048 branches to the "yes" branch whereupon, at step 1052, one of the fixed windows is moved to another (currently non-visible) page to make room for the application selected by the user. If the user wants to view the window that was moved, the user simply scrolls to the next page using one of the arrow GUI controls (see GUI controls 450 and 460 in FIG. 4). On the other hand, if the fixed grid is not full, then decision 1048 branches to the "no" branch bypassing step 1052. At step 1056, a new fixed window is created in the visible grid for the selected application. At step 1060, the selected application is loaded into the newly created window. Returning to decision 1044, if the selected application has already been loaded and a new instance of the application should not be created, then decision 1044 branches to the "no" branch whereupon, at step 1064, if needed, the grid is scrolled so that the selected application is visible in the displayed grid interface (e.g., if the selected application was not on the currently displayed page of the grid). Once the application is visible on the screen after either step 1060 or 1064, then the focus is set to the window displaying the selected application. Keystrokes and other events are directed at the window with focus. Processing then returns at 1072.

Returning to decision 1032, if a ribbon icon is not selected, then decision 1032 branches to the "no" branch whereupon a determination is made as to whether a window within the grid interface has been selected by the user (decision 1076). If a window within the grid interface has been selected by the user, then decision 1076 branches to the "yes" branch whereupon, at step 1078, focus is set to the window displaying the selected application. Keystrokes and other events are directed at the window with focus. Processing then returns at 1080.

Returning to decision 1076, if a grid window has not been selected, then decision 1076 branches to the "no" branch whereupon a determination is made as to whether the mixed mode interface has been selected (decision 1082, see, e.g., mixed mode icon 430 in FIG. 4). If the mixed mode interface has been requested, then decision 1082 branches to the "yes" branch whereupon, at predefined process 1084, the mixed mode interface is initialized (see FIG. 11 and corresponding text for processing details). Processing then returns at 1086.

Figure 13:
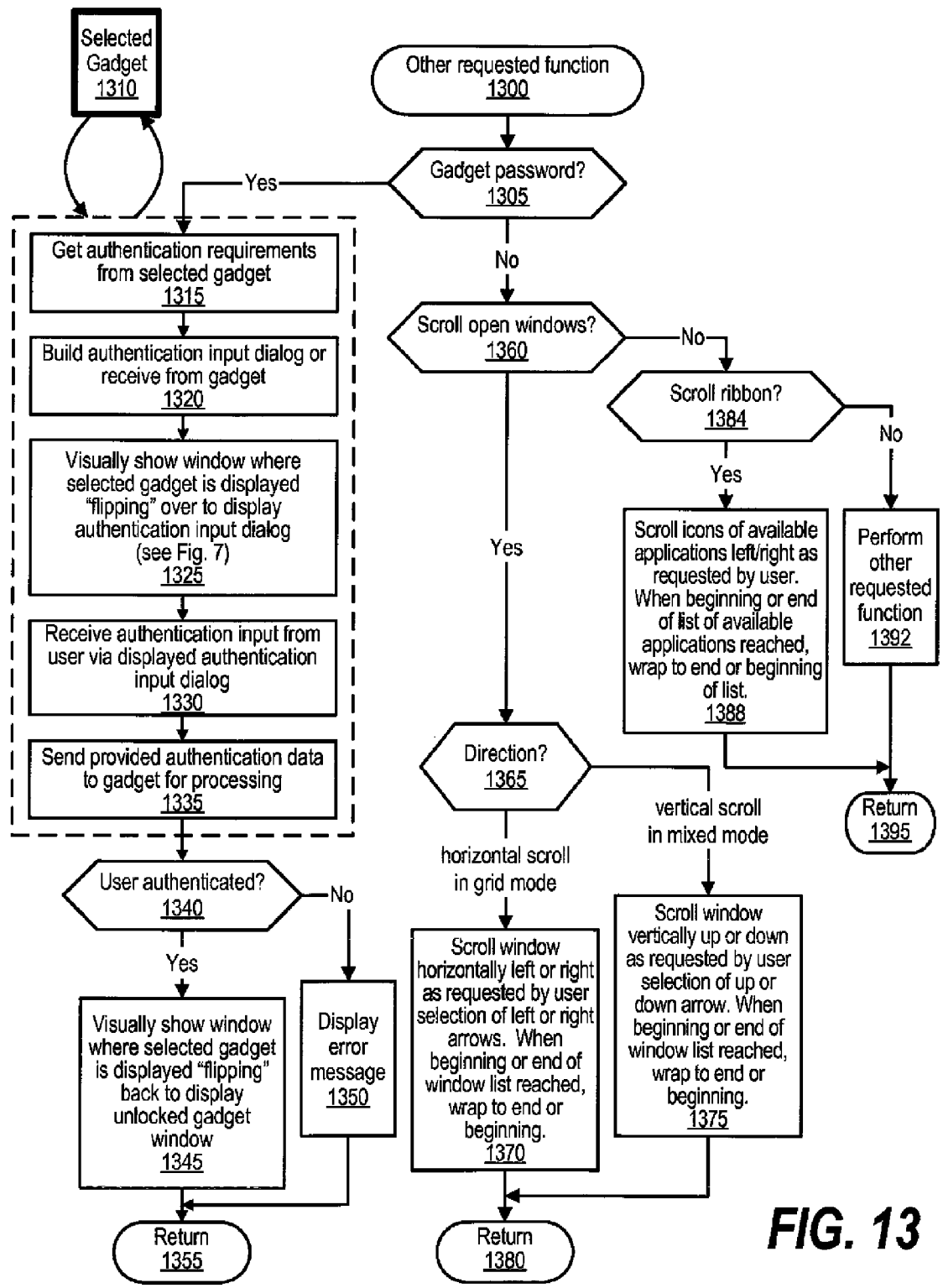
FIG. 13 is a flowchart showing steps taken to perform particular functions, including handling application logon processing.

Returning to decision 1082, if the mixed mode interface has not been requested, then decision 1082 branches to the "no" branch whereupon predefined process 1088 is performed (see FIG. 13 and corresponding text for processing details). Processing then returns to the calling routine at 1090.

Figure 11:
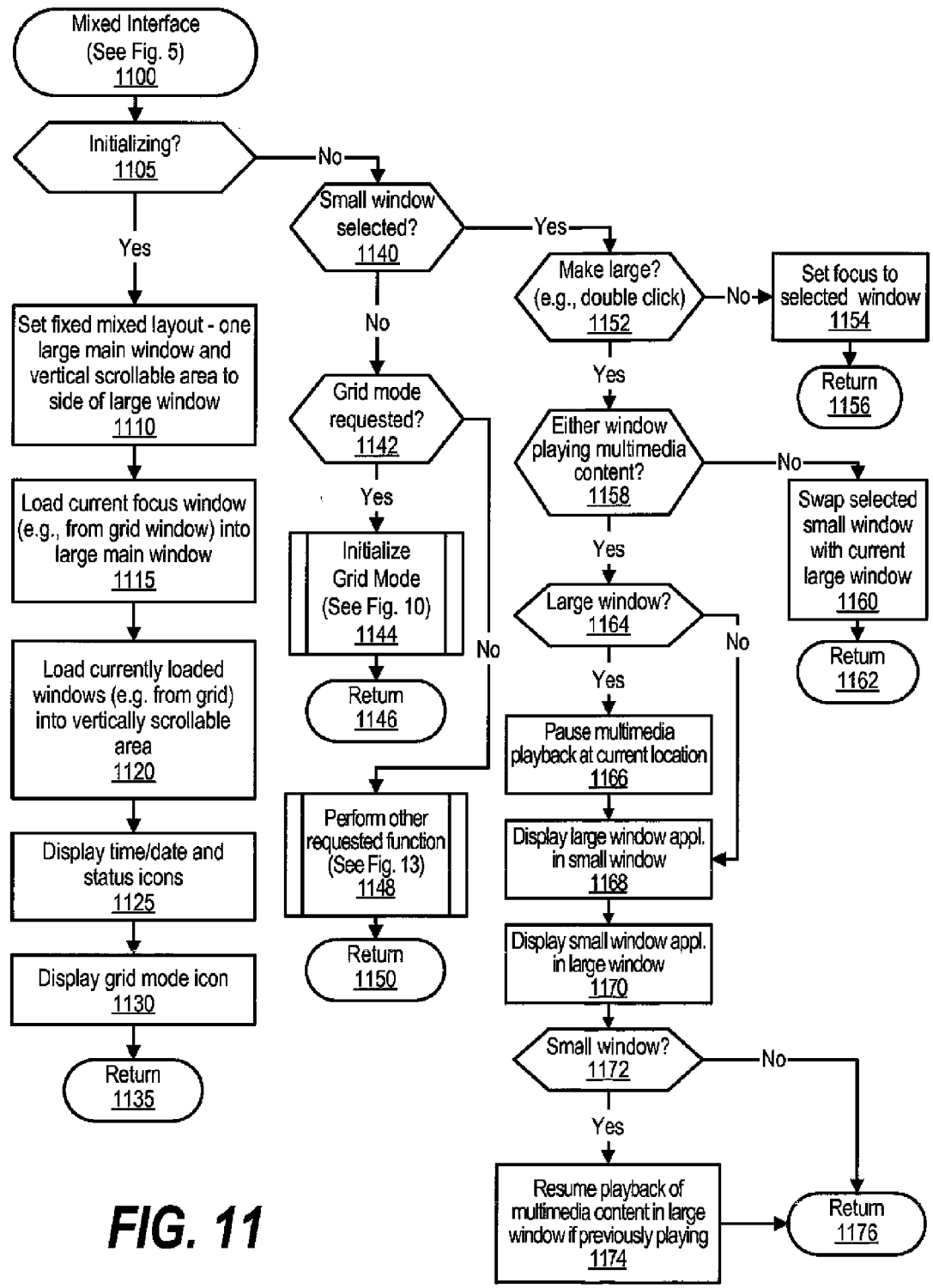
FIG. 11 is a flowchart showing steps taken to handle and display the mixed-mode display screen.

FIG. 11 is a flowchart showing steps taken to handle and display the mixed-mode display screen. Processing commences at 1100 whereupon a determination is made as to whether the mixed mode interface is being initialized (decision 1105). If the interface is being initialized, then decision 1105 branches to the "yes" branch whereupon, at step 1110 a fixed mixed mode interface layout is allocated and displayed on the available screen space. In the mixed mode layout, one window is a large window (see window 510 in FIG. 5) and the other windows are smaller and scrollable (see windows 410 in FIG. 5). In one embodiment, as shown in FIG. 5, the smaller scrollable windows are arranged vertically and can be scrolled up and down using the respective GUI controls. At step 1115, the window currently with focus is loaded into the large window and at step 1120 the other loaded applications are loaded into smaller windows 410. If more applications are loaded into smaller windows than can be displayed in the allocated small window space, then only a certain number of windows are visible with other windows becoming visible (and other visible windows no longer being visible) when the user selects the GUI controls for scrolling the small windows. At step 1125, the time and date and other small status icons are displayed on the mixed mode window. At step 1130, a grid mode icon is displayed (e.g., on the upper right portion of the screen). The grid mode icon, when selected, allows the user to view the grid mode interface (see FIG. 4). In one embodiment, a fullscreen icon is also displayed along with the mixed mode icon so that, when selected by the user, the application window that currently has focus is presented in a full screen interface (e.g., a multimedia application, etc.). Initialization processing returns to the calling routine at 1035.

Returning to decision 1105, if the mixed mode interface is not initializing, then decision 1105 branches to the "no" branch whereupon a determination is made as to whether one of the small windows (windows 410 shown in FIG. 5) has been selected (decision 1140). If a small window has not been selected, then decision 1140 branches to the "no" branch whereupon a determination is made as to whether the grid mode has been requested (e.g., by the user selecting the grid mode icon) at decision 1142. If the grid mode has been requested, then decision 1142 branches to the "yes" branch whereupon the grid mode is initialized at predefined process 1144 (see FIG. 10 and corresponding text for processing details). Processing then returns to the calling routine at 1146. Returning to decision 1142, if the grid mode has not been requested, then decision 1142 branches to the "no" branch whereupon predefined process 1148 is executed to handle the function requested by the user (see FIG. 13 and corresponding text for processing details). Processing thereafter returns at 1150.

Returning to decision 1140, if a small window has been selected, then decision 1140 branches to the "yes" branch whereupon a determination is made as to whether the user has requested (e.g., by use of a gesture such as a double-click) to display the application currently being displayed in the small window in the large window (decision 1152). If the user has not requested to display the small window application in the large window, then decision 1152 branches to the "no" branch whereupon, at step 1154, focus is set to the selected small window and processing returns at 1156. On the other hand, if the user has requested to display the small window application in the large window, then decision 1152 branches to the "yes" branch whereupon a determination is made as to whether either window (small or large) is currently playing multimedia content (decision 1158). If neither is playing multimedia content, then decision 1158 branches to the "no" branch whereupon, at step 1160, the application displayed in the small window is displayed in the large window and the application displayed in the large window is displayed in the small window (the applications swap places on the screen). Processing then returns at 1162.

Returning to decision 1158, if either window is playing multimedia content, the decision 1158 branches to the "yes" branch whereupon a determination is made as to whether the large window is currently playing multimedia content (decision 1164). If the large window is currently playing multimedia content, then decision 1164 branches to the "yes" branch whereupon the application is paused (step 1166) and a flag is set indicating that the application was paused during a swap operation. On the other hand, if the application playing in the large window is not playing multimedia content, then decision 1164 branches to the "no" branch bypassing step 1166. At step 1168, the application playing in the large window is displayed in the selected small window. At step 1170, the application that was playing in the small window is displayed in the large window. A determination is made as to whether the application that was displayed in the small window (and is now displayed in the large window) is playing multimedia content where play should be resumed (e.g., by checking the flag set in step 1166 when the application was previously swapped out) at decision 1172. If the application that was displayed in the small window (and is now displayed in the large window) is playing multimedia content that should be resumed, then decision 1172 branches to the "yes" branch whereupon, at step 1174, playback of the multimedia content is resumed in the large window. On the other hand, if the small window is not playing multimedia content (or playing of the content should not be resumed), then decision 1172 branches to the "no" branch bypassing step 1174. Processing then returns to the calling routine at 1176.

Figure 12:
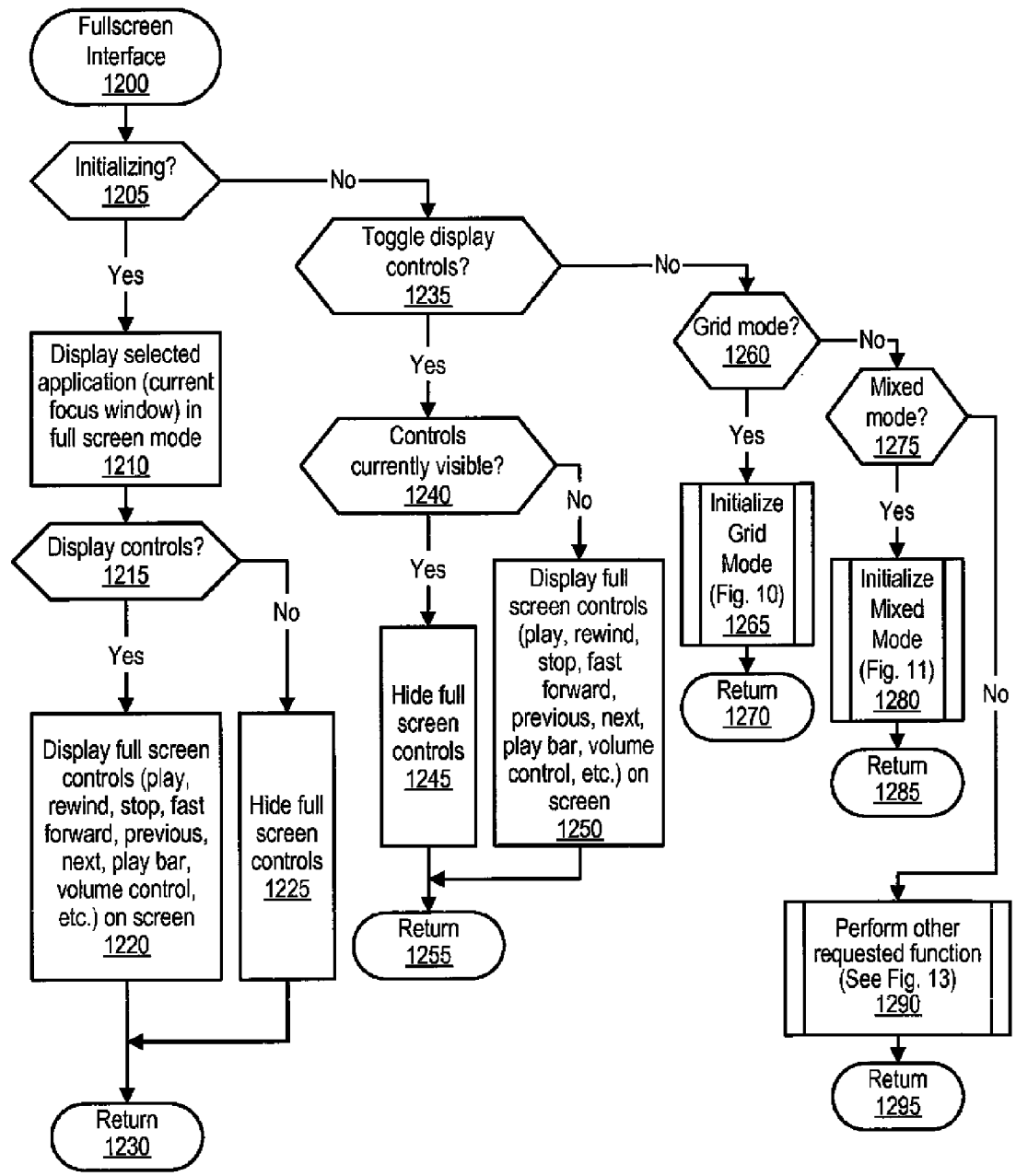
FIG. 12 is a flowchart showing steps taken to handle and display the fullscreen display.

FIG. 12 is a flowchart showing steps taken to handle and display the fullscreen display. Processing commences at 1200 whereupon a determination is made as to whether the fullscreen interface is being initialized (decision 1205). If the fullscreen interface is being initialized, then decision 1205 branches to the "yes" branch whereupon, at step 1210, the selected application (the window that had the focus) is displayed in fullscreen mode and other smaller windows are not displayed on the display screen. A determination is made as to whether to display controls, such as fast forward, rewind, and other controls (decision 1215). If the controls should be displayed, then decision 1215 branches to the "yes" branch whereupon, at step 1220, the fullscreen mode controls are displayed. In one embodiment, a cinema view and a fullscreen view are two different views that can be displayed in fullscreen mode. In cinema view, multimedia controls such as fast forward, play stop rewind previous, next, and volume controls are displayed. Other controls, such as those to switch to other view modes, such as grid mode and mixed mode, are also displayed (see FIG. 6 for examples of controls that are displayed in fullscreen mode). On the other hand, if fullscreen controls are not being displayed, then decision 1215 branches to the "no" branch whereupon, at step 1225, the fullscreen mode controls are hidden from view. Processing then returns to the calling routine at 1230.

Returning to decision 1205, if the fullscreen mode is not being initialized, then decision 1205 branches to the "no" branch whereupon a determination is made as to whether the user has requested to toggle the display of controls on the fullscreen display (decision 1235). If the user has requested to toggle the display of the controls, then decision 1235 branches to the "yes" branch whereupon a determination is made as to whether the controls are currently visible on the display (decision 1240). If the controls are currently visible, then decision 1240 branches to the "yes" branch whereupon, at step 1245, the fullscreen controls are hidden from view. On the other hand, if the controls are not currently visible, then decision 1240 branches to the "no" branch whereupon, at step 1250, the fullscreen mode controls are displayed on the display screen. As previously discussed, in one embodiment, a cinema view and a fullscreen view are two different views that can be displayed in fullscreen mode. In cinema view, multimedia controls such as fast forward, play stop rewind previous, next, and volume controls are displayed. Other controls, such as those to switch to other view modes, such as grid mode and mixed mode, are also displayed (see FIG. 6 for examples of controls that are displayed in fullscreen mode). Processing then returns to the calling routine at 1255.

Returning to decision 1235, if the user has not requested to toggle the display of fullscreen controls, then decision 1235 branches to the "no" branch whereupon a determination is made as to whether the user has requested to view grid mode (decision 1260, see FIG. 4 for an example of the grid mode). If the user has requested to view the grid mode, then decision 1260 branches to the "yes" branch whereupon, at predefined process 1265, the grid mode is initialized (see FIG. 10 and corresponding text for processing details). Processing then returns to the calling routine at 1270.

Returning to decision 1260, if the user is not requesting to view grid mode, then decision 1260 branches to the "no" branch whereupon a determination is made as to whether the user is requesting to view the mixed mode (decision 1275, see FIG. 5 for an example of the mixed mode). If the user is requesting to view mixed mode, then decision 1275 branches to the "yes" branch whereupon, at predefined process 1280, mixed mode is initialized (see FIG. 11 and corresponding text for processing details). Processing then returns to the calling routine at 1285. On the other hand, if the user is not requesting to view the mixed mode, then decision 1275 branches to the "no" branch whereupon, at predefined process 1290, some other function requested by the user is performed (see FIG. 13 and corresponding text for processing details). Processing then returns to the calling routine at 1295.

FIG. 13 is a flowchart showing steps taken to perform particular functions, including handling application logon processing. Processing commences at 1300 whereupon a determination is made as to whether a gadget (application) password is being requested (see FIG. 7 for an example of an application password dialog). As previously described, when application authentication is needed (e.g., to access the user's email account, etc.), then decision 1305 branches to the "yes" branch whereupon steps 1315 to 1355 are performed to handle the application authentication process. These steps communicate with the particular gadget (application) 1310. At step 1315, authentication requirements (e.g., name, password, etc.) are retrieved from selected application 1310. At step 1320, an authentication input dialog is built based on the authentication requirements provided by the selected application or the authentication dialog is provided by the selected gadget. At step 1325, the window (e.g., 410 in either FIG. 4 or 5, etc.) visually appears to "flip" to show the window's backside where the authentication input dialog is displayed to the user (see FIG. 7, window 700, for an example of the authentication input dialog). At step 1330, the requested authentication data (e.g., name, password, etc.) is received from the user via the displayed authentication input dialog. At step 1335, the received data is provided to selected application 1310 for processing. The selected application returns a response indicating whether the user's authentication data was successfully authenticated (decision 1340). If the user was successfully authenticated, then decision 1340 branches to the "yes" branch whereupon, at step 1345, the application window appears to visually "flip" back over to reveal the unlocked application (e.g., the user's email application with email messages being visible and readable, etc.). On the other hand, if the user was not successfully authenticated, then decision 1340 branches to the "no" branch whereupon, at step 1350, an appropriate error message is displayed to the user. Processing then returns to the calling routine at 1355.

Returning to decision 1305, if the request was not for input of application authentication data, then decision 1305 branches to the "no" branch whereupon a determination is made as to whether the request is to scroll through open windows (e.g., using horizontal scrolling controls 450 and 460 in FIG. 4 or vertical scrolling controls 550 and 560 shown in FIG. 5) at decision 1360. If the request is to scroll through open windows, then decision 1360 branches to the "yes" branch whereupon a determination is made as to which direction the user is requesting to scroll (decision 1365). If a horizontal scroll is being requested, then decision 1365 branches to the horizontal scroll branch whereupon the area of scrollable windows is scrolled horizontally left or right as requested by user selection of left or right arrows. When the beginning or end of window list reached, the scrolling wraps to end or beginning, respectively. On the other hand, if a vertical scroll is being requested, then decision 1365 branches to the vertical scroll branch whereupon the area of scrollable windows is scrolled up or down as requested by the user's selection of the up or down arrows. When the beginning or the end of the window list reached, scrolling wraps to the end or the beginning of the list, respectively. Processing then returns to the calling routine at 1380.

Returning to decision 1360, if the request is not to scroll through open windows, then decision 1360 branches to the "no" branch whereupon a determination is made as to whether to scroll through the icon ribbon bar (decision 1384). If the request is to scroll through the icon ribbon bar, then decision 1384 branches to the "yes" branch whereupon, at step 1388, scroll of icons corresponding to available applications is performed left or right as requested by user using the left or right arrow GUI controls. When the beginning or the end of the list of available applications reached, the display wraps to display the end or the beginning of list, respectively. On the other hand, if the request is not to scroll through icons displayed in the icon ribbon bar, then decision 1384 branches to the "no" branch whereupon the function requested by the user is performed. Processing then returns to the calling routine at 1395.

Figure 14:
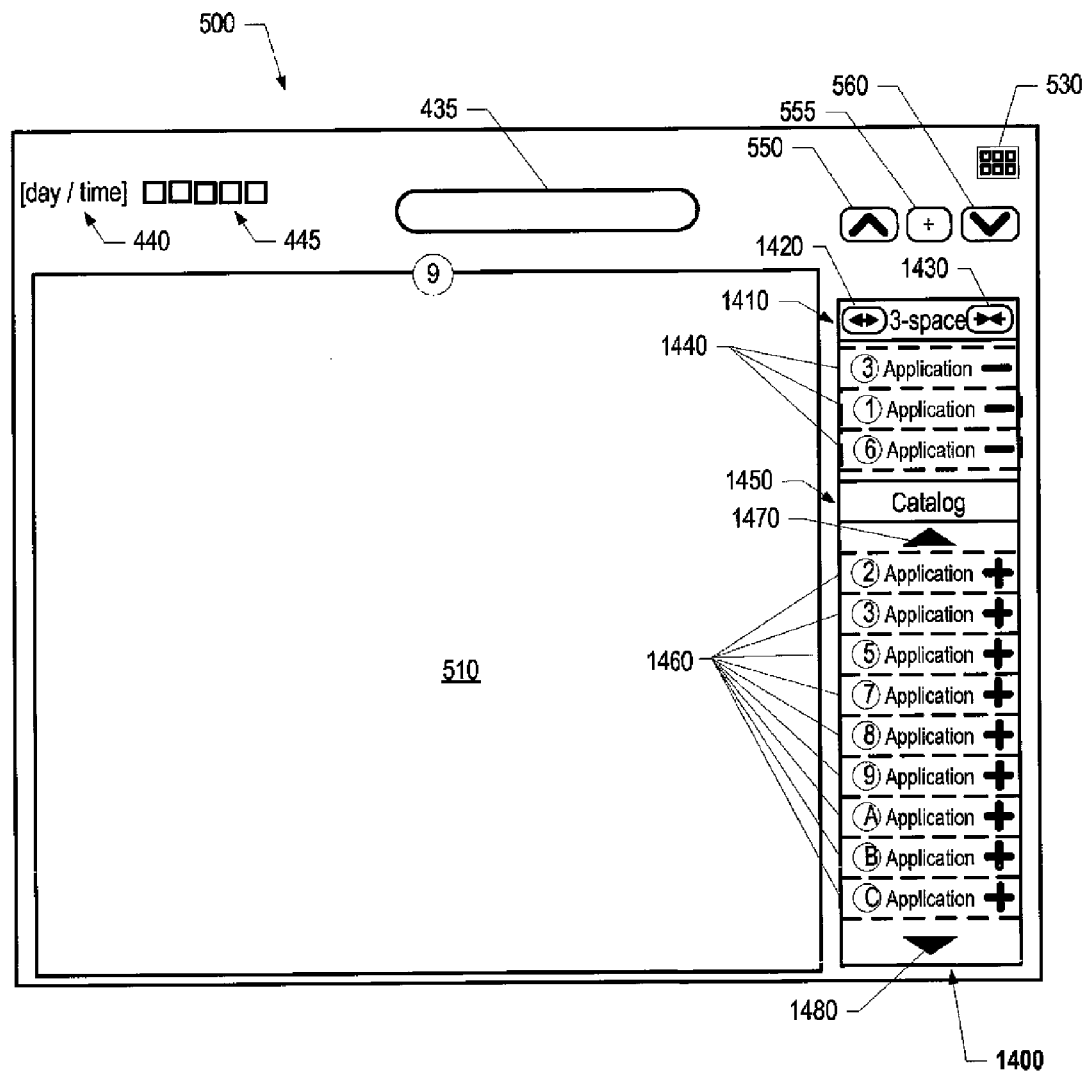
FIG. 14 is a diagram showing a mixed mode display screen with user management functionality of the vertically scrollable window area.

FIG. 14 is a diagram showing a mixed mode display screen with user management functionality of the vertically scrollable window area. When the user requests to manage the vertically scrollable window area by selecting GUI control 555 (see FIG. 5), then vertical scrollable window management display 1400 is displayed in the area where the vertically scrollable window area is normally seen (see FIG. 5). Vertical scrollable window management display 1400 includes visible application list 1410 and catalog 1450 of other applications. The visible application list includes applications 1440 and catalog 1450 includes applications 1460. To remove an application from the visible application list, the user selects the minus sign (−) icon displayed to the right of the selected application's name in the list. Likewise, to move an application from the catalog to the visible application list, the user selects the plus sign (+) icon displayed to the right of the desired application's name in the catalog. GUI controls 1470 and 1480 are used to scroll up and down, respectively, through the catalog. In addition, GUI controls 1420 and 1430 are used by the user to select how much width the vertically scrollable window area occupies. When GUI control 1420 is selected, the width of the windows in the vertically scrollable window is increased and the width of large window 510 is decreased by approximately the same amount. Likewise, when GUI control 1430 is selected, the width of the windows in the vertically scrollable window is decreased and the width of large window 510 is increased by approximately the same amount.

One of the implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

Additional Notes:

In addition, we have another view called Cinema view—this is specifically for viewing movies. When the User is in Cinema Mode, the Top Bar is hidden, all radios are turned off and all notifications are stopped. The idea of this is for viewing Movies and Television on both the Apollo display which supports 720p High Definition video playback and on an external monitor or HD Television. The thought is that Users really want to get a full TV like media experience in this mode. There is an Expand Button that exists in the Media Controls of the Media Apps (Photos, Music and Video). In build today. There is also a Control called a Snap Bar that exists in 3 Space Mode. The Snap Bar is a "grab handle" that exists between the primary Application area in 3 Space mode and the Gadgets on the Right side of the screen. When the User moves the Grab Handle Left or Right, the primary application area Snap's to a new width. There is a Keyboard Control that allows the User to press a keyboard combination to move to Full Screen and Cinema Mode. To return they can press the Esc key. The Snap Bar allows the User to move between three different views: Standard 3 Space Mode: When an application is opened by Clicking on the Gadget in 6 Space or 3 Space mode, the default size that it opens to is the area you see in the attached Mock Ups. This size is 1024 Pixels wide (not including the scroll bar). We selected this width specifically since most Web Sites today are optimized for the 1024 width screens. This will be a very unique feature in this platform since on a standard 1024 width computer—the Vertical Scroll Bar takes horizontal space which forces the User to have a Horizontal Scroll Bar which reduces the available viewing area. With the Fusion/Apollo design, the default width of the App when it opens is 1024+17 Pixels. The 17 Pixels is the Width of our Vertical Scroll bar. Our goal is to vastly reduce the chance of the User having wasted space used by this horizontal scroll bar. If needed we have wireframe drawings that show the exact dimensions of each area of the screen (Top Bar, Shuttle Bar, 6 Space Gadgets, 3 Space Narrow Gadgets, 3 Space Wide Gadgets, etc). Wide Gadget View: this Snap position will make the Gadgets exactly the same size and width as the 6 Space Gadgets. To move to this position, the User drags the Snap Bar left a small distance, when the let go of the grab handle with the pointer, the GUI snaps to the next position. The reasoning behind this is to allow Users to have larger Gadgets next to the working area where they may have a browser or other application such as Google Docs, Open Office or other Application. The larger Gadget size allows for more content in the viewable area of the Gadget as well as the ability to do more exciting feature like viewing a Movie the Gadget while they are surfing the Internet, doing Email or working on other tasks like Document editing/creation. Movies will play in the Video Gadget when it's in Narrow mode but are harder to see and become very small since this isn't the proper aspect ratio for most modern movies. Full Screen View: This is invoked when the User moves the Grab Handle from the Standard Width position to the Right a small distance. When this is done, the GUI goes to Full Screen Mode Cinema Mode: The User can move to Cinema mode by pressing the Media Player control that expands the screen. Direct to Cinema Mode Control: This feature isn't currently implemented but is planned for the first release. The idea is to have a control that is either on the Top Bar of the Multimedia Gadgets or within the Viewing area of these same gadgets (Final decision on location pending technical assessment). When the User presses this control, they will move from the Gadget view directly to Cinema View enabling a quick playback feature for movies as well as other media (Photo Screenshow, Music Playback). To return from these modes, the User can use: The Esc key to return from Cinema Mode and Full Screen to the previous state The Top Bar ICONs to return to 3 Space or 6 Space view directly. To Shutdown or Reboot the system, the User can: Press the Power Button: when pressed, they are presented with a Dialog Box (Shutdown, Reboot, Cancel). If they take no action, the default is to Shutdown, this will happen after a 60 second countdown delay. There will be a countdown timer on the screen. Click on the Apollo (code name) ICON on the top left of the Top Bar. This provides a drop down menu that allows the User to select Shutdown or Reboot directly from the menu. There are multiple focus concepts in the design Gadget Focus: when a User clicks anywhere in a gadget Top Bar, Bottom Bar or in the active area of the Window, the Gadget get's focus. When the Gadget has focus, the Screen Region Focus: The User will be able to select areas on the screen that would provide focus for the entire "region." Since this GUI isn't a traditional Single Document Interface (SDI) or Multiple Document Interface (MDI), we needed a method to provide Users control of regions of the screen so they can easily navigate, scroll, switch views, etc. For example: 3 Space Side Region Focus: There is a small Top Bar (similar to a title bar but with different functions) that exists in the 3 Space Region of the GUI. If the User clicks anywhere on this bar or on any button on this bar, they will have selected the entire region of the screen which will then have Focus Focus is indicated by a Blue Glow—see Focus Indicator description below. When this region has focus, the Touchpad, Mouse and Keyboard can be used to navigate within this region of the screen independently from other regions of the screen (such as Applications and Gadgets). The 3 Space Gadgets scroll up and down on the screen, independently from the 3 Space Application Region. In addition, each gadget supports the concept of scrolling within the gadget when needed. 3 Space Application Region Focus: when the Application Area has focus, the User can use Keyboard and Mouse controls to easily scroll between applications. Applications stay open if the User opens a second Application but are non-visible to either the Left or Right side of the visible window. To navigate between Application Windows the User can: Use the Ribbon Bar: The Ribbon Bar is used to quickly navigate between open applications. The Ribbon Bar is unique in the Fusion/Apollo user interface since it provides navigation in multiple directions. The User can Navigate Left or Right in the open Applications In addition, the User can navigate directly to a nested instance of the Application. If an application has more than one instance opened the Ribbon bar will show up with a single (most recently used instance) view of the application in the Ribbon Left/Right string. The applications are shown as small screen images of the running application. If this application has other instances running—(such as the Multimedia Apps, Music, Video, Photos or Documents), then if the User hovers over the picture of the application image, a pop-up will slide up and show the User pictures of each of the running instances that reflect the current state of those applications. The ribbon bar is invoked multiple ways: If the pointer is held at the bottom of the screen for a pre-determined period (currently 225 ms—tuning in process), the Application Bar slides into place (final animation under development). There is also a keyboard control that allows navigation to the Ribbon bar. The final key combinations are being tested but the following is a representative example: The User presses Ctrl+Tab or Alt+Tab—the Ribbon Bar slides into place The Ribbon Bar now has focus The User can move between applications using the Tab key on the keyboard. If the User presses Enter, that application Fades into view (Fade is an animation that would fade the currently visible application into the background and then fade the requested application into view. If the User Tabs to a new application and that application has multiple instances running, the pictures of those instances slide into view and if the User waits a small amount of time, the Tab Key will allow navigation between those applications as well. When the User reaches the end of the nested application list, pressing Tab will move to the next Application in the Ribbon Bar. If the last Application is reached, the next press of the Tab key will loop back to the first Application in the 1st. Focus Indicator: There will be a visual indicator when a Gadget or Area has "focus". The current design is a Blue Glow effect that indicates that this region of the screen or this specific Gadget or Application has Focus. Quick Notify/Quick Reply feature: Some other unique features of our GUI include the way we Notify users of incoming events and then allow them to take actions that are high value without having to open an application or Gadget directly. For example, if you look at the SMS Charts I've attached, you will see the SMS Quick Text concept in action. A new TXT (SMS or MMS) message arrives The Top Bar ICON Flashes and a Sound notifies the User of the incoming TXT A notification area slides into view. The User can take direction action from this notification area (rather than having to open the full function GUI as is traditionally used in IM/TXT type applications. For example, the User can press the Reply Button in the notification area and quickly read the TXT and then reply to that TXT without opening the full SMS Application. This concept will be used in the Instant Messaging tools that are being developed as well for Apollo/Fusion. This will include a Chat tool and a VOIP tool. A unique feature of the Fusion GUI design is the way we have tied in communication and control functions between gadgets and applications. For example, the User can start the playback of a video in the Video gadget and then decide to move to another task. To continue watching the Video, all they need is for the Video gadget to be in the visible area. This not only allows them to see video playing in the gadget but also allows direct manipulation of the Video controls. To do this, we have set up a communications pipe between gadgets and Apps. Another example is applications like Mail—our gadget allows the User to directly manipulate the content in the browser. An example, would be reading/editing/management of mail. The User can bring the Side Space gadget into view simultaneously with the browser. In the browser, they can see the current email. In the Gadget, they can see a list of all emails. They can take action in the Gadget and see that action directly reflected in the Application. For example, they could move to the next mail with far fewer clicks since they don't have to navigate in the browser (1 click, vs 3) or they could do tasks like deleting or composing new mail by a single click in the Gadget. There will be a Chat ICON for Instant Messaging and an SMS ICON for SMS Text. There will also be a language ICON that allows the User to quickly change language settings if they are using a language that could required mixed keyboard support like Chinese.

What is claimed is:

1. A device, comprising:
   a display;
   a processor;
   a memory accessible to the processor and bearing instructions executable by the processor to:
   present a grid user-interface on the display, wherein the grid user-interface includes a plurality of medium-sized windows presented in a grid format;
   receive a mixed-mode request corresponding to a selected application that is presented in one of the plurality of medium-sized windows; and
   present a second user-interface display in response to receiving the mixed-mode request wherein the selected application is presented in a large window and a plurality of small-sized windows is presented adjacent to the large window, wherein each of the small-sized windows is smaller than a medium-sized window, wherein responsive to selection of a first small-sized window to be presented as the large window, determining whether either of the first small-sized window and the large window is playing multimedia content, and
   responsive to a determination that neither the first small-sized window nor the large window is playing multimedia content, present a first application presented in the first small-sized window in the large window and present a second application presented in the large window in the first small-sized window such that the first and second applications swap places on the display;
   responsive to a determination that the second application in the large window is playing multimedia content, pause play of the multimedia content in the large window and then present the first application in the large window and present the second application in the first small-sized window such that the first and second applications swap places on the display; and
   responsive to a determination that the second application in the large window is not playing multimedia content and the first application in the first small-sized window is playing multimedia content, present the first application in the large window and present the second application in the first small-sized window such that the first and second applications swap places on the display.

2. The device of claim 1, wherein the instructions are executable to:
   receive a full-screen mode request corresponding to the selected application that is presented in one of the plurality of medium-sized windows in the grid user-interface; and
   present a full-screen user-interface on the display in response to receiving the full-screen mode request, wherein the selected application is presented in a substantially full-screen and wherein the plurality of medium-sized windows is removed from the display.

3. The device of claim 1, wherein the instructions are executable to:
   present an icon ribbon in the grid user-interface that includes a first set of icons selected from the plurality of icons, wherein each of the icons in the first set of icons corresponds to an available application;
   present one or more ribbon scroll graphic user interface (GUI) controls adjacent to the icon ribbon that, when selected, scroll through a second set of icons selected from the plurality of icons, wherein each of the icons in the second set of icons corresponds to an available application.

4. The device of claim 1, wherein the instructions are executable to:
   determine whether the first application presented in the first small-sized is playing multimedia content that should be resumed, and resume playback of the multimedia content after swapping the applications in the first small-sized window and large window.

5. The device of claim 1, wherein the instructions are executable to:
   present a GUI scroll control proximate to the grid user-interface;
   receive a scroll request at the GUI scroll control; and
   present a second plurality of medium-sized windows in the grid user-interface in response to receiving the scroll request, wherein the second plurality of medium-sized windows inhibits presentation of two or more of the medium-sized windows included in the plurality of medium-sized windows.

6. The device of claim 1, wherein the instructions are executable to:
   present a GUI scroll control proximate to the small-sized windows when the second user interface is presented;
   receive a scroll request at the GUI scroll control; and
   present a second plurality of small-sized windows in the second user-interface in response to receiving the scroll request, wherein the second plurality of small-sized windows inhibits presentation of at least one of the small-sized windows included in the plurality of small-sized windows.

7. A method, comprising:
   presenting a grid user-interface on a display, wherein the grid user-interface includes a plurality of medium-sized windows presented in a grid format;
   receiving a mixed-mode request corresponding to a selected application that is presented in one of the plurality of medium-sized windows; and
   presenting a second user-interface display in response to receiving the mixed-mode request wherein the selected application is presented in a large window and a plurality of small-sized windows is presented adjacent to the large window, wherein each of the small-sized windows is smaller than a medium-sized window, wherein responsive to selection of a first small-sized window to be presented as the large window, determining whether either of the first small-sized window and the large window is playing multimedia content, and
   responsive to a determination that neither the first small-sized window nor the large window is playing multimedia content, presenting a first application presented in the first small-sized window in the large window and presenting a second application presented in the large window in the first small-sized window such that the first and second applications swap places on the display;
   responsive to a determination that the second application in the large window is playing multimedia content, pausing play of the multimedia content in the large window and then presenting the first application in the large window and presenting the second application in the first small-sized window such that the first and second applications swap places on the display; and
   responsive to a determination that the second application in the large window is not playing multimedia content and the first application in the first small-sized window is playing multimedia content, presenting the first application in the large window and presenting the second application in the first small-sized window such that the first and second applications swap places on the display.

8. The method of claim 7, comprising:

receiving a full-screen mode request corresponding to the selected application that is presented in one of the plurality of medium-sized windows in the grid user-interface; and presenting a full-screen user-interface on the display in response to receiving the full-screen mode request, wherein the selected application is presented in a substantially full-screen and wherein the plurality of medium-sized windows is removed from the display.

9. The method of claim 7, comprising:

presenting an icon ribbon in the grid user-interface that includes a first set of icons selected from the plurality of icons, wherein each of the icons in the first set of icons corresponds to an available application;

presenting one or more ribbon scroll graphic user interface (GUI) controls adjacent to the icon ribbon that, when selected, scroll through a second set of icons selected from the plurality of icons, wherein each of the icons in the second set of icons corresponds to an available application.

10. The method of claim 7, comprising:

determining whether the first application presented in the first small-sized is playing multimedia content that should be resumed, and resuming playback of the multimedia content after swapping the applications in the first small-sized window and large window.

11. The method of claim 7, comprising:

presenting a GUI scroll control proximate to the grid user-interface;

receiving a scroll request at the GUI scroll control; and presenting a second plurality of medium-sized windows in the grid user-interface in response to receiving the scroll request, wherein the second plurality of medium-sized windows inhibits presentation of two or more of the medium-sized windows included in the plurality of medium-sized windows.

12. The method of claim 7, comprising:

presenting a GUI scroll control proximate to the small-sized windows when the second user interface is presented;

receiving a scroll request at the GUI scroll control; and presenting a second plurality of small-sized windows in the second user-interface in response to receiving the scroll request, wherein the second plurality of small-sized Windows inhibits presentation of at least one of the small-sized windows included in the plurality of small-sized windows.

13. A computer readable storage medium that is not a carrier wave, the computer readable storage medium bearing instructions executable by a processor to:

present a grid user-interface on a display, wherein the grid user-interface includes a plurality of medium-sized windows presented in a grid format;

receive a mixed-mode request corresponding to a selected application that is presented in one of the plurality of medium-sized windows; and present a second user-interface display in response to receiving the mixed-mode request wherein the selected application is presented in a large window and a plurality of small-sized windows is presented adjacent to the large window, wherein each of the small-sized windows is smaller than a medium-sized window, wherein responsive to selection of a first small-sized window to be presented as the large window, determining whether either of the first small-sized window and the large window is playing multimedia content, and responsive to a determination that neither the first small-sized window nor the large window is playing multimedia content, present a first application presented in the first small-sized window in the large window and present a second application presented in the large window in the first small-sized window such that the first and second applications swap places on the display;

responsive to a determination that the second application in the large window is playing multimedia content, pause play of the multimedia content in the large window and then present the first application in the large window and present the second application in the first small-sized window such that the first and second applications swap places on the display; and responsive to a determination that the second application in the large window is not playing multimedia content and the first application in the first small-sized window is playing multimedia content, present the first application in the large window and present the second application in the first small-sized window such that the first and second applications swap places on the display.

14. The computer readable storage medium of claim 13, wherein the instructions are executable to:

receive a full-screen mode request corresponding to the selected application that is presented in one of the plurality of medium-sized windows in the grid user-interface; and present a full-screen user-interface on the display in response to receiving the full-screen mode request, wherein the selected application is presented in a substantially full-screen and wherein the plurality of medium-sized windows is removed from the display.

15. The computer readable storage medium of claim 13, wherein the instructions are executable to:

present an icon ribbon in the grid user-interface that includes a first set of icons selected from the plurality of icons, wherein each of the icons in the first set of icons corresponds to an available application;

present one or more ribbon scroll graphic user interface (GUI) controls adjacent to the icon ribbon that, when selected, scroll through a second set of icons selected from the plurality of icons, wherein each of the icons in the second set of icons corresponds to an available application.

16. The computer readable storage medium of claim 13, wherein the instructions are executable to:

determine whether the first application presented in the first small-sized is playing multimedia content that should be resumed, and resume playback of the multimedia content after swapping the applications in the first small-sized window and large window.

17. The computer readable storage medium of claim 13, wherein the instructions are executable to:

present a GUI scroll control proximate to the grid user-interface;

receive a scroll request at the GUI scroll control; and present a second plurality of medium-sized windows in the grid user-interface in response to receiving the scroll request, wherein the second plurality of medium-sized windows inhibits presentation of two or more of the medium-sized windows included in the plurality of medium-sized windows.

18. The computer readable storage medium of claim 13, wherein the instructions are executable to:
present a GUI scroll control proximate to the small-sized windows when the second user interface is presented;
receive a scroll request at the GUI scroll control; and
present a second plurality of small-sized windows in the second user-interface in response to receiving the scroll request, wherein the second plurality of small-sized windows inhibits presentation of at least one of the small-sized windows included in the plurality of small-sized windows.

* * * * *